US006972395B2

(12) United States Patent
Jones

(10) Patent No.: US 6,972,395 B2
(45) Date of Patent: Dec. 6, 2005

(54) APPARATUS AND METHOD FOR TRACKING THE MELTING OF FROZEN PRECIPITATION

(75) Inventor: Thaddeus M. Jones, Bremen, IN (US)

(73) Assignee: MSX, Inc., South Bend, IN (US)

( * ) Notice: Subject to any disclaimer, the term of this patent is extended or adjusted under 35 U.S.C. 154(b) by 32 days.

(21) Appl. No.: 10/682,573

(22) Filed: Oct. 9, 2003

(65) Prior Publication Data

US 2004/0262414 A1  Dec. 30, 2004

Related U.S. Application Data

(63) Continuation-in-part of application No. 10/607,237, filed on Jun. 26, 2003.

(51) Int. Cl.$^7$ .............................. H05B 1/02; H05B 3/02

(52) U.S. Cl. ....................... 219/213; 340/602; 219/497

(58) Field of Search ............................... 219/213, 483, 219/486, 497; 340/580, 581, 601, 602, 604; 244/134 R, 134 D, 134 A

(56) References Cited

U.S. PATENT DOCUMENTS

| | | | | |
|---|---|---|---|---|
| 4,051,466 A | * | 9/1977 | Protze | 340/601 |
| 4,687,163 A | * | 8/1987 | Ringer | 219/213 |
| 4,980,673 A | * | 12/1990 | Kleven | 340/581 |
| 5,140,135 A | * | 8/1992 | Freeman | 219/497 |
| 5,345,223 A | * | 9/1994 | Rutkiewicz | 340/581 |
| 5,710,408 A | * | 1/1998 | Jones | 219/213 |
| 5,900,178 A | * | 5/1999 | Johnsen | 219/497 |
| 6,140,609 A | * | 10/2000 | Jones | 219/213 |
| 6,328,467 B1 | * | 12/2001 | Keyhani | 374/16 |

* cited by examiner

Primary Examiner—Teresa J. Walberg
(74) Attorney, Agent, or Firm—Taylor & Aust, P.C.

(57) ABSTRACT

A snow melting system including a controller, a first heater supplying heat under the control of the controller, the first heater supplying heat at a power density, a moisture detection apparatus located apart from the first heater, the moisture detection apparatus communicatively coupled to the controller and a second heater located proximate to the moisture detection apparatus, the controller directing power to the second heater at an other power density, the other power density substantially the same as the power density.

16 Claims, 4 Drawing Sheets

APPARATUS AND METHOD FOR TRACKING THE MELTING OF FROZEN PRECIPITATION

CROSS REFERENCE TO RELATED APPLICATIONS

This is a continuation-in-part of U.S. patent application Ser. No. 10/607,237, entitled "APPARATUS AND METHOD FOR MONITORING OF AN AUTOMATIC DEICING CONTROLLER", filed Jun. 26, 2003.

BACKGROUND OF THE INVENTION

1. Field of the Invention

The present invention relates to deicing equipment, and, more particularly, to automatic controls for deicing equipment used to melt and remove snow and ice from pavement, roofs, gutters, downspouts and the like.

2. Description of the Related Art

Electric and hydronic heaters are commonly used to melt ice and snow. Applications include pavement and similar structures, but also include roofs, downspouts and gutters. Pavement applications include sidewalks, driveways, stairs, drive through window areas, building portals, loading docks, bridge decks, parking garages and off ramps, etc.

Typically, automatic controls are utilized to sense ambient temperature and moisture to control ice removal heating equipment. Heater elements may include hydronic tubing installed under or proximate to areas in which the removal of ice or snow is desirable. Hydronic systems include an interface with a heating system that provides energy for the removal of ice and snow. Electrical heating cables may also be employed that consist of stranded copper wires separated by a semi-conductor polymer enclosed in one or more layers of organic insulating material, this type of electrical cable is often referred to as self-limiting or self-regulating heating cable. Additionally, an insulated resistant wire may be used, which maintains a relatively constant resistance as it dissipates heat. The insulation may consist of magnesium oxide or various polymeric materials.

The status of, and functioning of, the automatic control can be determined by way of a visual indicator on the control or an electrical interface to which an electrical device can be connected to analyze the functioning of the control. The visual indicator thereon may indicate the sensed temperature, the presence of electrical power and whether moisture is detected. Additionally, the automatic control can be checked if the temperature and moisture are controlled to a point of causing the controller to energize the heating system to thereby verify operation of the control system.

The power density used for the melting of snow on pavement varies between 30 and 60 Watts/ft$^2$, with 45–50 Watts/ft$^2$ being typical. In comparison, the heaters used to melt snow and ice on a precipitation sensor has typically been at least 380 Watts/ft$^2$. This power density is more than eight times greater than that of the pavement heaters which are typically controlled by the controller. The higher power density has been utilized by controllers to determine the amount of frozen precipitation so that the time in which the precipitation stopped can be determined and to burn through any accumulated snow on the sensor. This prior art approach results in a guess as to when the precipitation on the pavement will be dissipated. It is a guess because the precipitation on the sensor is typically dissipated before the moisture on the pavement is melted. To compensate for the unknown the heater is held on for a predetermined time to ensure the melting of the ground precipitation. The typical heater hold-on time is usually 2½ to 10 hours.

What is needed in the art is an automatic heater controller that tracks the melting of the precipitation on the pavement or walkway by way of a remotely mounted sensor.

SUMMARY OF THE INVENTION

The present invention provides a monitoring method and apparatus having a sensor that tracks the melting of the precipitation on the heated pavement.

The invention comprises common in one form thereof, a snow melting system including a controller, a first heater supplying heat under the control of the controller, the first heater supplying heat at a power density, a moisture detection apparatus located apart from the first heater, the moisture detection apparatus communicatively coupled to the controller and a second heater located proximate to the moisture detection apparatus, the controller directing power to the second heater at an other power density, the other power density substantially the same as the power density.

An advantage of the present invention is that a shorter hold-on time for the heater in the pavement can be utilized.

Another advantage is that the controller accurately determine's the completion of the moisture dissipation on a pavement by melting the frozen precipitation on the sensor at the same rate as that utilized in the heating element associated with the pavement.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
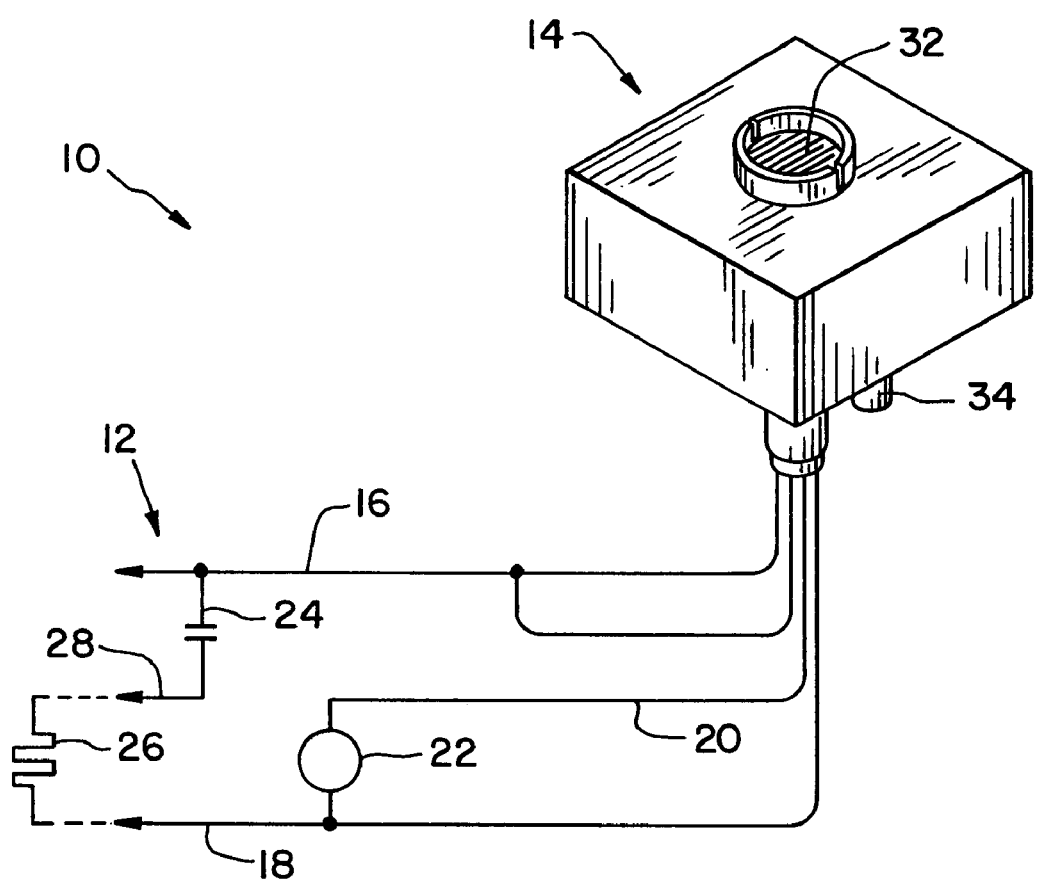
FIG. 1 is combination perspective view of an embodiment of a heater control of the present invention and a schematical form of typical external circuitry attached thereto.

Referring now to the drawings, and more particularly to FIG. 1, there is shown one embodiment of a deicing control system 10 of the present invention. System 10 includes power system 12 and control system 14.

Power system 12 includes power conductors 16 and 18, control conductor 20, relay coil 22, relay contact 24 and heater system 26. Power conductors 16 and 18 are connected to electrical power such as a 120 volt circuit. Power conductors 16 and 18 also provide power to control system 14. Control conductor 20 receives a signal from control system 14 that drives relay coil 22 causing a controllable connection of relay contact 24 thereby allowing power to flow from power conductor 16 through heater system 26 to power conductor 18. Heater system 26 can be the controlling pump of a hydronic heating system 26 or an electrical heating element 26.

Figure 2:
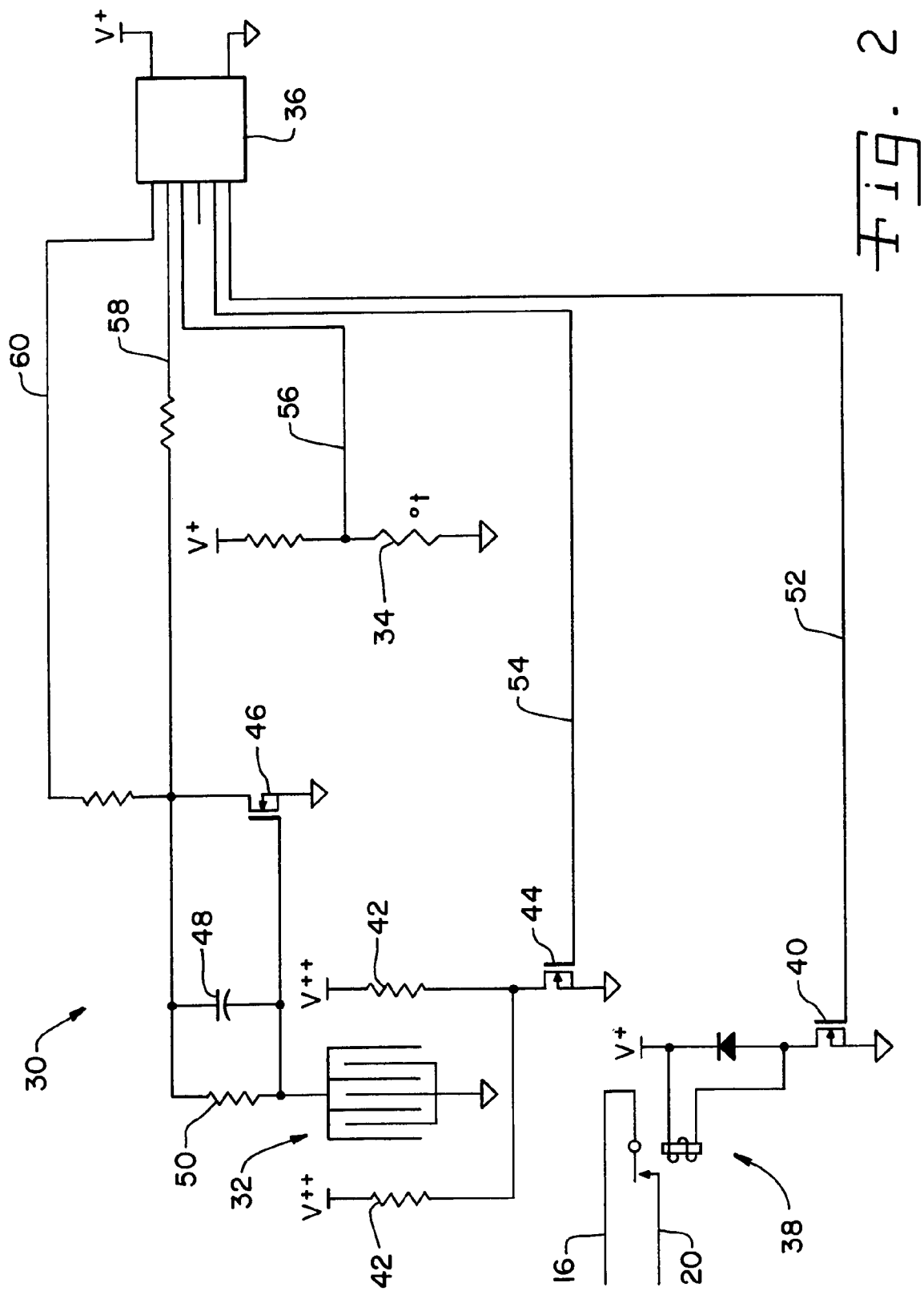
FIG. 2 is a schematic diagram of a heater control of FIG. 1.

Now, additionally referring to FIG. 2, there is shown a control circuit 30, which is part of control system 14. Control system 14 also includes moisture detector 32 and temperature detector 34. Moisture detector 32 includes a moisture grid that is a spaced apart interdigitated set of conductors exposed on the top of control system 14. Moisture, in the form of water, ice, snow and/or sleet on the surface of moisture detector 32 is detected by a current flow between fingers of the interdigitated conductors.

Prior moisture detectors measured the conductivity between the interdigitated conductors using an uninterrupted supply of a DC voltage. This causes electrochemical problems including polarization and copper electroplating that reduces the life expectancy and reliability of the sensor. Polarization occurs when DC current flows through the grid when wet. The water from melted snow and ice becomes an electrolyte due to atmospheric contamination and the ions therefrom are positioned, due to the constant electro-potential on the interdigitated fingers. However, the circuit and method employed by the present invention reduces this problem to a negligible proportion by employing an active sensing technique that reduces the current through the moisture detection grid by more than an order of magnitude. Further, the circuit detects moisture on the sensing grid in the form of ice, in any form, without the need for heating the sensor to turn the ice into water. An advantage of this approach is that heat is not dissipated in the moisture sensor at a higher rate than that utilized in the pavement, or other application areas, where the heating element is distributing the heat. The advantage of this is that the moisture on the moisture detector will dissipate at the same rate as the moisture on the ground or other area under the control of control system 14. The selection of the power density that is applied to the moisture sensor to melt the snow and ice on the conductive grid is such that it operates to allow the snow and ice to be removed at approximately the same rate as that on the ground. This advantageously permits a shorter hold-on time of the heating system thereby saving energy. The hold-on time, of approximately one hour, ensures complete melting of the moisture and the evaporation of any standing melt water.

Figure 4:
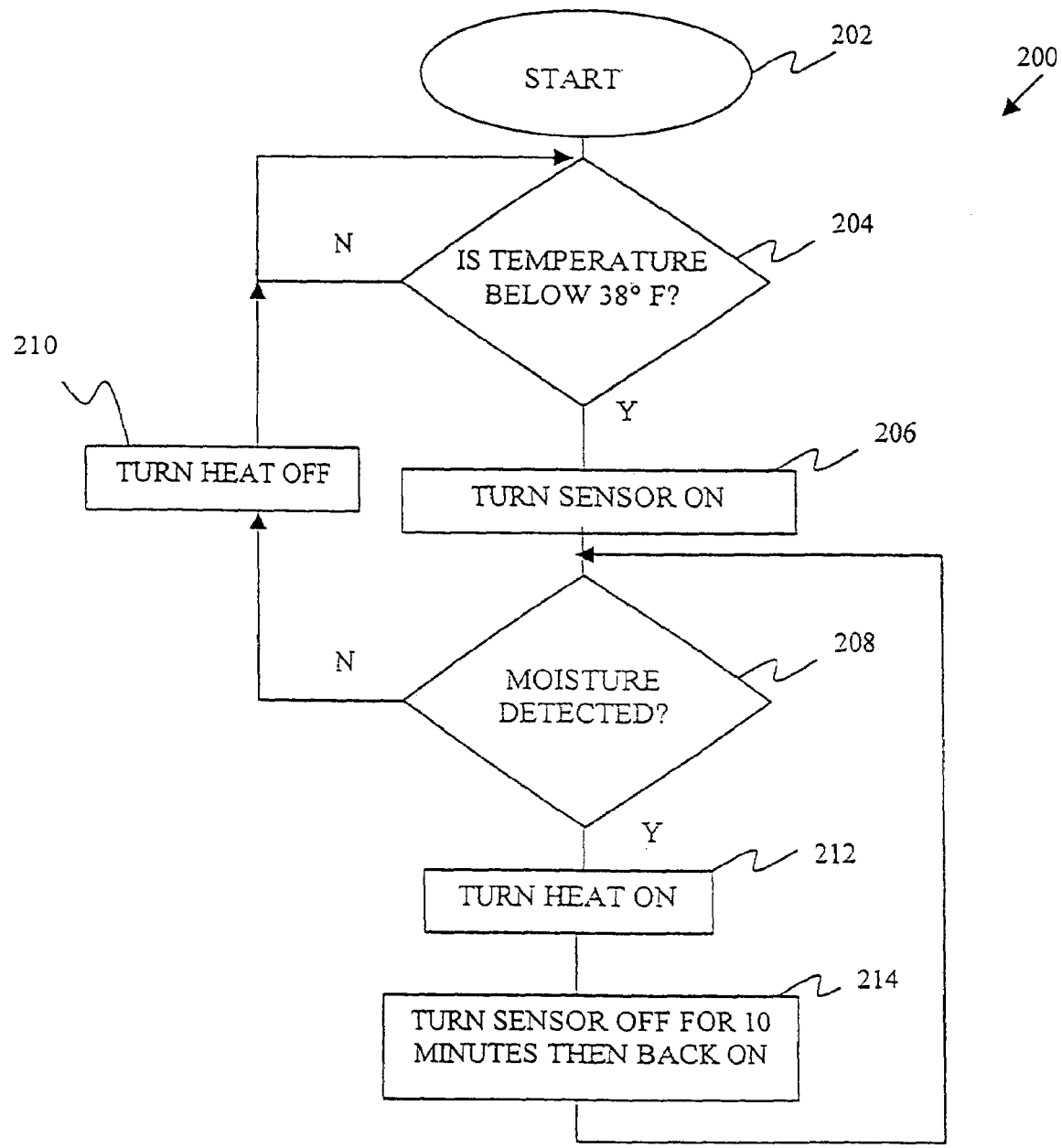
FIG. 4 is a block diagram of another method used by the heater controller of FIGS. 1 and 2.

Now, additionally referring to FIG. 4, there is illustrate a method 200 that is utilized to determine when moisture detector 32 is energized and when heater elements 26 located in pavement or walkway 27 are energized. Method 200 starts at step 202 and continues to step 204, where the temperature of the air is determined to be above or below a predetermined value such as 38° F. If temperature sensor 34 detects a temperature equal to or above the predetermined value then method 200 returns to step 204.

If temperature sensor 34 detects an air temperature below the predetermined value, then method 200 proceeds to step 206. At step 206, moisture sensor 32 is turned on by controller 36.

At step 208, if moisture is detected by moisture sensor 32, method 200 proceeds to step 212. If moisture sensor 32 does not detect moisture then method 200 proceeds to step 210.

At step 212, heating element 26 is turned on, thereby providing heat to pavement 27. When the heat is turned on at step 212, controller 36 additionally activates heaters 42. Heaters 42 are sized to provide the same or substantially the same power density as that being applied to heater element 26 is pavement 27.

At step 214, method 200 de-energizes moister sensor 32 for a predetermined time, such as ten minutes. After the completion of the predetermined time period, moisture sensor 32 is reenergized and method 200 proceeds to step 208.

If no moisture is then detected at step 208, method 200 proceeds to step 210. At step 210, power to heaters 42 is removed and heat to heating element 26 is held on for a predetermined time, such as one hour, and then automatically heating element 26 is de-energized. Method 200 then proceeds back to step 204. Advantageously, since the melting of precipitation on moisture detector 32 approximates the rate of the melting of precipitation on pavement 27, a relatively short hold-on time can be used, thereby reducing energy costs.

Power to the moisture sensor is turned off at temperatures above 38° F. At lower temperatures excitation of moisture detector 32 is continuous until precipitation is detected. Thereafter, moisture detector 32 is electrically activated at predetermined intervals, such as every six minutes, for a few seconds to check for the presence of moisture. If moisture had been previously detected, then the detection of a lack of moisture marks the beginning of the heater hold-on time interval. This modulating of the DC voltage on moisture detector 32 advantageously reduces the average current flowing through moisture detector 32 thereby prolonging its life.

Alternatively, at step 212, when energy is applied to heating element 26, the energy supplied to resistors 42 may be modulated by controller 36 to thereby provide a power density to moisture detector 42 that matches the power density of heating element 26 in pavement 27. This advantageously allows a standard heating element 42 to be utilized with the power density being under the control of controller 36. The selection of the power density to be applied to moisture detector 32 by way of heating elements 42 can be predetermined or selected at the time of installation.

Additionally, another technique in detecting moisture involves the measurement of AC conductivity of the moisture-sensing grid of moisture detector 32. Low frequency AC excitation reduces the electrochemical deterioration of the surface of the moisture sensing grid when it is exposed to precipitation in any form, since the average current is zero. Further, the measurement of the AC capacitance of the moisture-sensing grid of moisture detector 32 may be used to detect moisture.

Control circuit 30 incorporates a negative temperature coefficient precision thermistor 34 to convert the ambient temperature into a voltage value using half of a DC excited Wheatstone bridge. The other half of the bridge is supplied by a successive approximation routine that utilizes an analog-to-digital converter in microcontroller 36. Since both halves of the Wheatstone bridge are excited by supply voltage $V^+$, the encoded temperature value is essentially independent of variations in $V^+$.

Control circuit 30 includes microcontroller 36, relay 38, field effect transistor (FET) 40, heater elements 42, FET 44, FET 46; capacitor 48 and resistor 50. Controller 36 is interconnected with temperature detector 34, FETs 40, 44 and 46. FET 40 controls the driving power to relay 38, thereby providing an electrical connection between power line 16 and control line 20. This places microcontroller 36 in control of the power supplied to heating element 26. FET 44 is connected to resistive elements 42 that are proximate to and/or integrated with moisture detector 32. Resistors 42 provide heat to moisture detector 32 when energized by FET 44. FET 46 functions as an operational amplifier having a feedback capacitor 48 and a feedback resistor 50. Feedback capacitor 48 serves to integrate current conducted from moisture detector 32. Feedback resistor 50 provides a leak off of the integrated value otherwise integrated by FET 46, capacitor 48 and current from moisture detective 32.

Conductors 52, 54, 56, 58 and 60 electrically interconnect microcontroller 36 with elements of control circuit 30. Conductor 52 connects controller 36 with FET 40 thereby allowing controller 36 to turn power on to heater element 26 in a controllable manner. Conductor 54 is interconnected with controller 36 and FET 44 thereby controlling power to heating elements 42 that heat moisture detector 32. The control of heat to moisture detector 32 is selected such that the power density applied thereto matches the power density in the deicing area. Microcontroller 36 advantageously controls the power supplied to heater elements 42, in a programmed manner, to substantially match the heat density applied to moisture detector 32 to that supplied to the deicing area by way of heating element 26. Conductor 56 provides a voltage level from thermistor 34 that corresponds with the external temperature. The voltage level is utilized by controller 36 to determine the ambient temperature and decide when to activate FETs 40, 44 and 46. For example, if the temperature detected from thermistor 34 is above 38°, FETs 40, 44 and 46 will not be activated. When the temperature detected is below 38° F. moisture detector 32, by way of conductors 58 and 60, is activated to determine if any moisture is present on moisture detector 32. If moisture is detected on moisture detector 32, then conductor 52 is energized thereby causing FET 40 to be conductive causing the contact in relay 38 to close, thereby providing power to relay coil 20, causing relay contact 24 to close, thereby directing electrical power to heating element 26. FET 44 is modulated according to a prescribed power density to approximate the power density of heater element 26. Once moisture is detected from moisture detector 32, conductor 60 is de-energized for a predetermined amount of time. After the predetermined amount of time conductor 60 is re-energized to again detect the presence or absence of moisture on moisture detector 32. Conductor line 58 serves as a sensor input to microcontroller 36 and conductor 60 supplies power to moisture detector 32. Microcontroller 36 is a microprocessor driven controller and in the preferred embodiment a microchip 12C672 8-bit Harvard Architecture device is utilized. Microcontroller 36 advantageously has analog input and digital input/output ports, which are correspondingly interconnected to conductors 52, 54, 56, 58 and 60.

Figure 3:
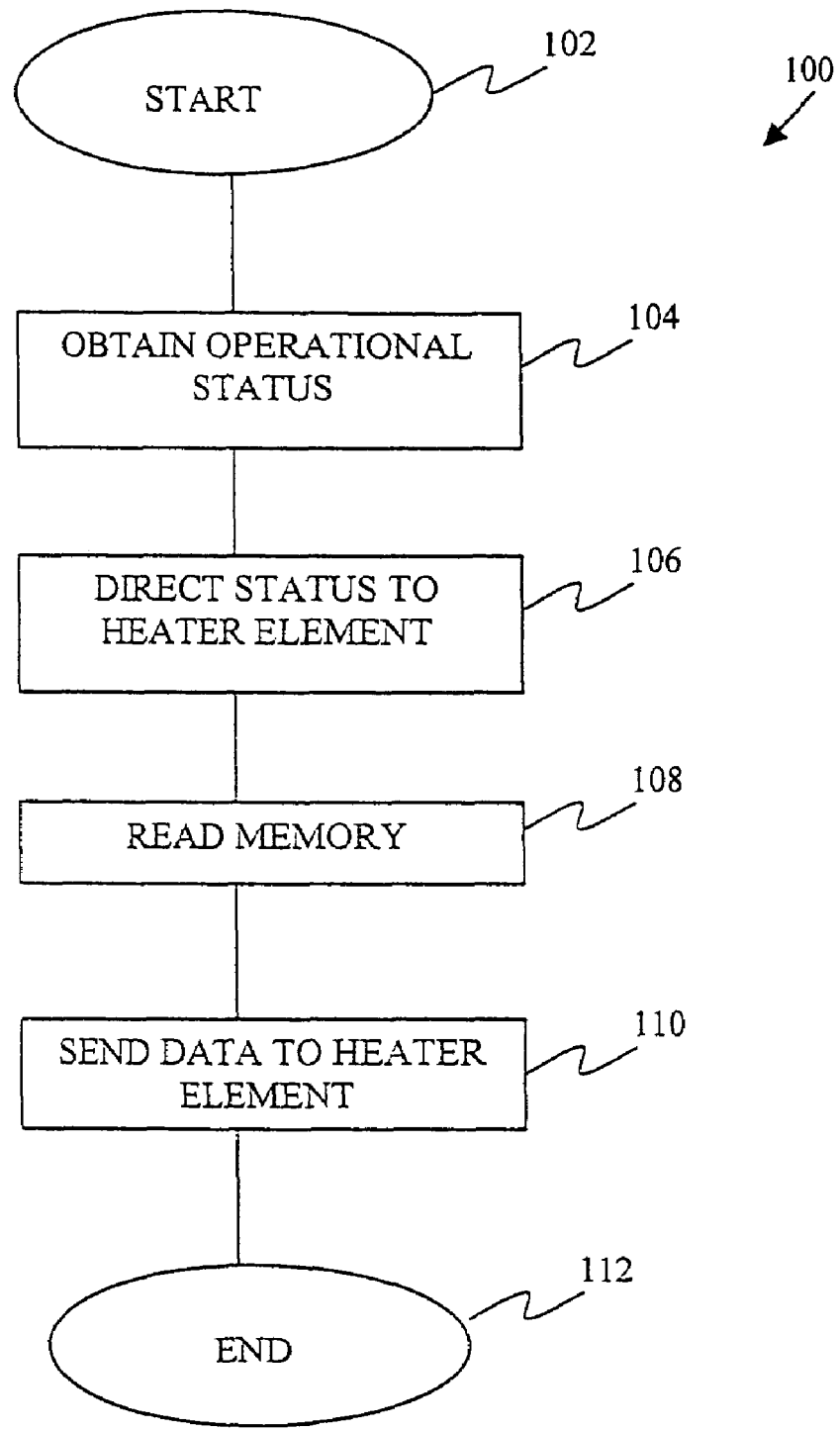
FIG. 3 is a block diagram of a method used by the heater controller of FIGS. 1 and 2.

Now, additionally referring to FIG. 3, there is shown a method 100 that is executed by microcontroller 36. Method 100 is initiated at step 102, upon power on of control system 14 or upon a manual initiation, for example, by the pressing of a button not shown. Upon initiation, method 100 proceeds to step 104 in which controller 36 obtains the operational status of control system 14. Operational status includes a test of moisture detector 32, a reading of temperature reported by detector 34 and the status of power applied to FETS 40, 44 and 46. Status information thus obtained at step 104 is then available for transmittal at step 106.

At step 106, status information about control system 14 is directed to heater element 26 by way of relay 38 and relay elements 22 and 24. The information is conveyed by a predetermined pulsing of relay 38 causing the current flowing through heating element 26 to be turned on and off in a predetermined pattern. The pulsing of the current through the heater element 26 can be detected by an operator having placed a clamp-on amp meter around conductor 28 to thereby detect the pattern being pulsed from control system 14. The information passed to heater element 26 includes the current temperature detected by temperature detector 34 and whether or not moisture detector 32 is detecting any moisture. Additionally, status regarding microcontroller 36 and the status of relay 38 upon turn on may be directed to heater element 26.

Method 100 proceeds to step 108 wherein controller 36 reads a memory contained within microcontroller 36 that contains historical operating information. The historical operating information may include performance in a previous time period such as the last time controller 36 energized heater element 26 and the duration thereof.

At step 110, microcontroller 36 sends the historical data to heater element 26 again by a predetermined pulsing pattern of power under the control of FET 40, relay 38 and relay elements 22 and 24. The information sent to heater element 26 is thereby interpreted by an operator observing a voltmeter detecting the application of voltage to heater element 26 or by way of an amp meter detecting the current through conductor 28. Alternatively, if relay elements 22 and 24 include a light circuit, the operator can detect the pulse pattern by observing the light on the relay or listen to the relay closures. Advantageously, the present invention conveys information regarding control system 14 to a user by way of a pulse pattern to the heating element, thereby allowing control system 14 to provide operating information without the need of applying a controlled temperature and moisture environment to temperature detector 34 and moisture detector 32 to thereby test the operation of control system 14.

The information provided from control system 14 to heater element 26 and conductor 28 may be in the form of pulsing steps, which include varying the time duration of pulses or the frequency of pulses in the pattern. The pattern of pulses is completed in a relatively short period of time upon turn power-up of control system 14. The relatively short period of time may be less than one minute in duration and more specifically less than 30 seconds. Additionally, the pulse pattern may be delayed for a short period of time allowing an operator to move from a power on switch to the amp meter to thereby detect the information. The delay in operation may be a predetermined time such as 2 minutes.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A snow melting system, comprising:
  a controller;
  a first heater supplying heat under the control of said controller, said first heater supplying heat at a power density;
  a moisture detection apparatus located apart from said first heater, said moisture detection apparatus communicatively coupled to said controller; and
  a second heater located proximate to said moisture detection apparatus, said controller directing power to said second heater at an other power density, said other power density substantially the same as said power density, said second heater having a potential power density higher than said power density, said controller controlling said power to thereby cause said other power density to approximate said power density.

2. The system of claim 1, wherein said controller causes said other power density to approximate said power density by alternately applying said power to said second heater and not applying said power to said second heater.

3. The system of claim 1, wherein said controller discontinues the supply of heat after a predetermined time once no moisture is sensed by said moisture detection apparatus.

4. The system of claim 3, wherein said predetermined time is one of less than and equal to approximately one hour.

5. The system of claim 1, wherein said controller discontinues supplying said power if an air temperature is detected higher than a predetermined temperature.

6. The system of claim 5, wherein said predetermined temperature is approximately 38° Fahrenheit.

7. A method of tracking the removal of snow and moisture, comprising:
provviding a controller connected to a first heater, a second heater and a moisture sensor;
dissipating at least one of snow and water by heat from said first heater, said dissipating occurring at a dissipation rate; and
substantially matching said dissipation rate on said moisture sensor by heat from said second heater by modulating power to said second heater, said moisture sensor located apart from said first heater.

8. The method of claim 7, further comprising the step of discontinuing the supply of energy to said first heater after a predetermined time once no moisture is sensed by said moisture sensor.

9. The method of claim 8, wherein said predetermined time is one of less than and equal to approximately one hour.

10. The method of claim 7, further comprising the step of not checking for moisture when an air temperature is detected higher than a predetermined temperature.

11. The method of claim 10, wherein said predetermined temperature is approximately 38° Fahrenheit.

12. A method of tracking snow melting, comprising the steps of:
providing a controller connected to a first heater, a second heater and a moisture sensor;
dissipating power in said first heater at a power density; and
supplying power to said second heater to heat a moisture sensor at approximately said power density, said moisture sensor located apart from said first heater; and
controlling said power being supplied to said second heater to approximate said power density by alternately applying said power to said second heater and not applying said power to said second heater to thereby approximate said power density.

13. The method of claim 12, further comprising the step of discontinuing said dissipating step and said supplying step after a predetermined time once no moisture is sensed by said moisture sensor.

14. The method of claim 13, wherein said predetermined time is one of less than and equal to approximately one hour.

15. The method of claim 12, further comprising the step of discontinuing said dissipating step and said supplying step if an air temperature is detected higher than a predetermined temperature.

16. The method of claim 15, wherein said predetermined temperature is approximately 38° Fahrenheit.

* * * * *